(12) United States Patent
Zhang et al.

(10) Patent No.: US 10,582,250 B2
(45) Date of Patent: Mar. 3, 2020

(54) INTEGRATED VIDEO CODEC AND INFERENCE ENGINE

(71) Applicants: Advanced Micro Devices, Inc., Sunnyvale, CA (US); ATI Technologies ULC, Markham (CA)

(72) Inventors: Lei Zhang, Richmond Hill (CA); Sateesh Lagudu, Hyderabad (IN); Allen Rush, Danville, CA (US); Razvan Dan-Dobre, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/657,613

(22) Filed: Jul. 24, 2017

(65) Prior Publication Data

US 2019/0028752 A1  Jan. 24, 2019

(51) Int. Cl.
*H04N 21/4143* (2011.01)
*G06F 3/14* (2006.01)
(Continued)

(52) U.S. Cl.
CPC .......... *H04N 21/4143* (2013.01); *G06F 3/14* (2013.01); *H04N 7/141* (2013.01); *H04N 7/147* (2013.01);
(Continued)

(58) Field of Classification Search
CPC .... H04N 21/4143; H04N 7/141; H04N 7/147; H04N 7/15; G06F 3/14
See application file for complete search history.

(56) References Cited

U.S. PATENT DOCUMENTS

| | | |
|---|---|---|
| 6,067,287 A | 5/2000 | Chung-Ju et al. |
| 8,131,660 B2 | 3/2012 | Davis et al. |

(Continued)

FOREIGN PATENT DOCUMENTS

| | | |
|---|---|---|
| EP | 3098762 A1 | 11/2016 |
| WO | 2017003887 A1 | 1/2017 |

OTHER PUBLICATIONS

Lagudu et al., U.S. Appl. No. 15/812,336, entitled "Memory Bandwidth Reduction Techniques for Low Power Convolutional Neural Network Inference Applications", filed Nov. 14, 2017, 41 pages.
(Continued)

*Primary Examiner* — Ruiping Li
(74) *Attorney, Agent, or Firm* — Kowert Hood Munyon Rankin and Goetzel PC; Rory D. Rankin

(57) ABSTRACT

Systems, apparatuses, and methods for integrating a video codec with an inference engine are disclosed. A system is configured to implement an inference engine and a video codec while sharing at least a portion of its processing elements between the inference engine and the video codec. By sharing processing elements when combining the inference engine and the video codec, the silicon area of the combination is reduced. In one embodiment, the portion of processing elements which are shared include a motion prediction/motion estimation/MACs engine with a plurality of multiplier-accumulator (MAC) units, an internal memory, and peripherals. The peripherals include a memory interface, a direct memory access (DMA) engine, and a microprocessor. The system is configured to perform a context switch to reprogram the processing elements to switch between operating modes. The context switch can occur at a frame boundary or at a sub-frame boundary.

20 Claims, 8 Drawing Sheets

(51) Int. Cl.
*H04N 7/14* (2006.01)
*H04N 7/15* (2006.01)
*H04N 19/172* (2014.01)
*H04N 19/90* (2014.01)
*H04N 21/418* (2011.01)
*H04N 19/42* (2014.01)
*G06T 9/00* (2006.01)

(52) U.S. Cl.
CPC ............ *H04N 7/15* (2013.01); *H04N 19/172* (2014.11); *H04N 19/42* (2014.11); *H04N 19/90* (2014.11); *H04N 21/4183* (2013.01); *G06T 9/007* (2013.01); *G09G 2340/02* (2013.01)

(56) References Cited

U.S. PATENT DOCUMENTS 10,078,794 B2    9/2018  Pierce et al.
2018/0189641 A1*  7/2018  Boesch et al.

OTHER PUBLICATIONS

Zhang et al., U.S. Appl. No. 16/117,302, entitled "Machine Learning Inference Engine Scalability", filed Aug. 30, 2018, 32 pages.
Lagudu et al., U.S. Appl. No. 16/177,218, entitled "Low Latency Long Short-Term Memory Inference with Sequence Interleaving", filed Oct. 31, 2018, 28 pages.
Zhang et al., U.S. Appl. No. 16/234,956, entitled "Tiling Format for Convolutional Neural Networks", filed Dec. 28, 2018, 42 pages.
Wang et al., U.S. Appl. No. 16/367,093, entitled "Auto Generation and Tuning Tool for Convolution Kernels", filed Mar. 27, 2019, 32 pages.
International Search Report and Written Opinion in International Application No. PCT/US2018/052358, dated Feb. 18, 2019, 13 pages.
Cecconi et al., "Optimal Tiling Strategy for Memory Bandwidth Reduction for CNNs", International Conference on Advanced Concepts for Intelligent Vision Systems, Sep. 18, 2017, pp. 89-100.
Fan et al., "F-C3D: FPGA-based 3-Dimensional Convolutional Neural Network", 27th International Conference on Field Programmable Logic and Applications (FPL), Sep. 4, 2017, 4 pages.
Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.

* cited by examiner

INTEGRATED VIDEO CODEC AND INFERENCE ENGINE

BACKGROUND

DESCRIPTION OF THE RELATED ART

Various applications benefit from video compression which requires less storage space for archived video information and/or less bandwidth for the transmission of the video information. Accordingly, various techniques to improve the quality and accessibility of the digital video have being developed. For example, H.264, a video compression scheme has been adopted by the Motion Pictures Expert Group (MPEG) to be the video compression scheme for the MPEG-4 format for digital media exchange. H.264 is MPEG-4 Part 10. H.264 was developed to address various needs in an evolving digital media market, such as relative inefficiency of older compression schemes, the availability of greater computational resources, and the increasing demand for High Definition (HD) video.

H.264 is an example of an encoding scheme developed to have a much higher compression ratio than previously available in order to efficiently store and transmit higher quantities of video data, such as HD video data. For various reasons, the higher compression ratio often comes with a significant increase in the computational complexity required to decode the video data for playback. Efficient processing of H.264/MPEG-4 can be difficult to perform for various types of processing hardware. Other encoding schemes also suffer from inefficiencies when implemented on existing processing hardware. As used herein, a "video codec" is defined as hardware and/or software for encoding and/or decoding digital video.

Another emerging technology field is machine learning, with a convolutional neural network being one type of a machine learning model. Convolutional neural networks have demonstrated excellent performance at tasks such as hand-written digit classification and face detection. Additionally, convolutional neural networks have also shown promise for performing well in other, more challenging visual classification tasks. Video codecs utilize large amounts of processing resources (e.g., multiplier-accumulator (MAC) units), peripherals (e.g., memory interface, direct memory access (DMA engine), microprocessor), and internal memory storage. Similarly, machine learning models utilize significant amounts of processing resources, peripherals, and internal memory storage. Accordingly, techniques for reducing silicon area, processing resource utilization, and/or memory bandwidth are desired. Other optimizations for reducing silicon area are also desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for integrating a video codec with an inference engine are disclosed herein. In one embodiment, a system includes at least a plurality of processing elements coupled to one or more memories. The system is configured to implement an inference engine and a video codec. As used herein, an "inference engine" is defined as the implementation of a machine learning model or expert system. In one embodiment, an "inference engine" is a trained convolutional neural network. In various embodiments, the trained neural network may represent a pruned or otherwise optimized version of a neural network used for training. The system is also configured to share at least a portion of the processing elements between the inference engine and the video codec. In one embodiment, the processing elements include a plurality of multiplier-accumulator (MAC) units. In one embodiment, the portion of processing elements which are shared include a locally connected memory and a motion prediction/motion estimation/MACs engine. In one embodiment, the system is configured to interleave video codec operations and inference engine operations when processing a video stream.

In one embodiment, the system is configured to decompress a first video frame or sub-frame using the processing elements programmed as a video codec. Then, the system performs a context switch to reprogram the processing elements to operate as an inference engine. Next, the system processes the first video frame or sub-frame (or a second video frame or sub-frame) with the processing elements operating as the inference engine. The inference engine generates one or more label probabilities for the video frame or sub-frame. Then, the system performs a context switch to reprogram the processing elements to operate as a video codec. Next, the system receives and decompresses a second video frame or sub-frame using the video codec. This scheme can continue for any number of video frames with the system interleaving video codec and inference engine operations. It is noted that the switch between the video codec and the inference engine can occur at the frame boundary or the switch can occur at a sub-frame boundary.

Figure 1:
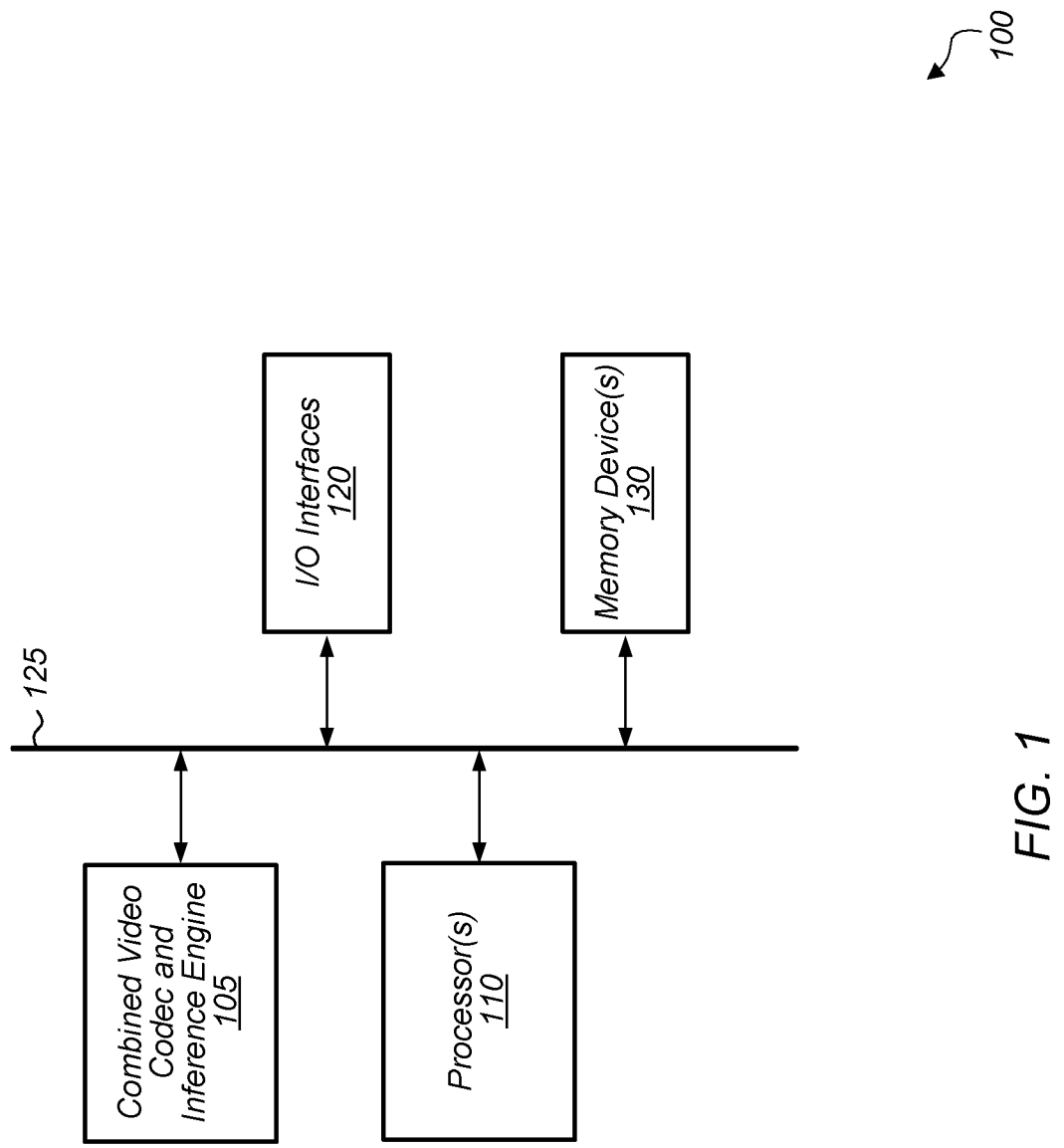
FIG. 1 is a block diagram of one embodiment of a computing system.

Referring now to FIG. 1, a block diagram of one embodiment of a computing system 100 is shown. In one embodiment, computing system 100 includes at least combined video codec and inference engine 105, processor(s) 110, input/output (I/O) interfaces 120, bus 125, and memory device(s) 130. It is noted that combined video codec and inference engine 105 can also be referred to as combined unit 105. In other embodiments, computing system 100 can include other components and/or computing system 100 can be arranged differently.

In one embodiment, combined video codec and inference engine 105 includes logic for implementing a video codec and logic for implementing an inference engine. In one embodiment, the inference engine implements one or more layers of a convolutional neural network. For example, in this embodiment, the inference engine implements one or more convolutional layers and/or one or more fully connected layers. Generally speaking, an "inference engine" is defined as hardware and/or software which receives image data and generates one or more label probabilities for the image data. An "inference engine" can also be referred to as a "classification engine" or a "classifier". In one embodiment, a portion of the logic is shared between the video codec and the inference engine. The portion of the logic that is shared can include a plurality of multiplier-accumulator (MAC) units, peripherals, and internal memory storage. In one embodiment, the peripherals include a memory interface, a direct memory access (DMA) engine, and a microprocessor. The video codec is configured to decode compressed video streams and/or encode uncompressed video streams. In one embodiment, the video codec is configured to operate in accordance with one or more video compression standards. It is noted that as used herein, the term "video codec" can refer to a video decoder, a video encoder, or a video codec. In some cases, a video decoder is integrated with an inference engine in unit 105. In other cases, a video encoder is integrated with an inference engine in unit 105. Accordingly, as used throughout the remainder of this disclosure, the term "video codec" is intended to encompass any of these implementations.

In one embodiment, the inference engine of combined unit 105 is a trained neural network. For example, in this embodiment, the inference engine is configured to analyze a video frame to generate one or more label probabilities for the video frame. For example, potential use cases include at least eye tracking, object recognition, point cloud estimation, ray tracing, light field modeling, depth tracking, and others. For eye tracking use cases, the inference engine can be based on learned patterns, dwell, transition angles, blink, etc. In other embodiments, the inference engine can be customized for other types of use cases. In one embodiment, the inference engine is approximated by integer or reduced precision weight parameters. These approximations can be close to optimal accuracy and enable substantial speed up and power reduction for the inference engine. Additionally, in one embodiment, the inference engine is implemented with multiple internal channel processing engines to reduce memory bandwidth utilization when implementing a convolutional neural network. In other embodiments, the inference engine can implement other types of machine learning models.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one embodiment, some of the processing associated with combined video codec and inference engine 105 is performed by processor(s) 110. Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by combined video codec and inference engine 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

Figure 2:
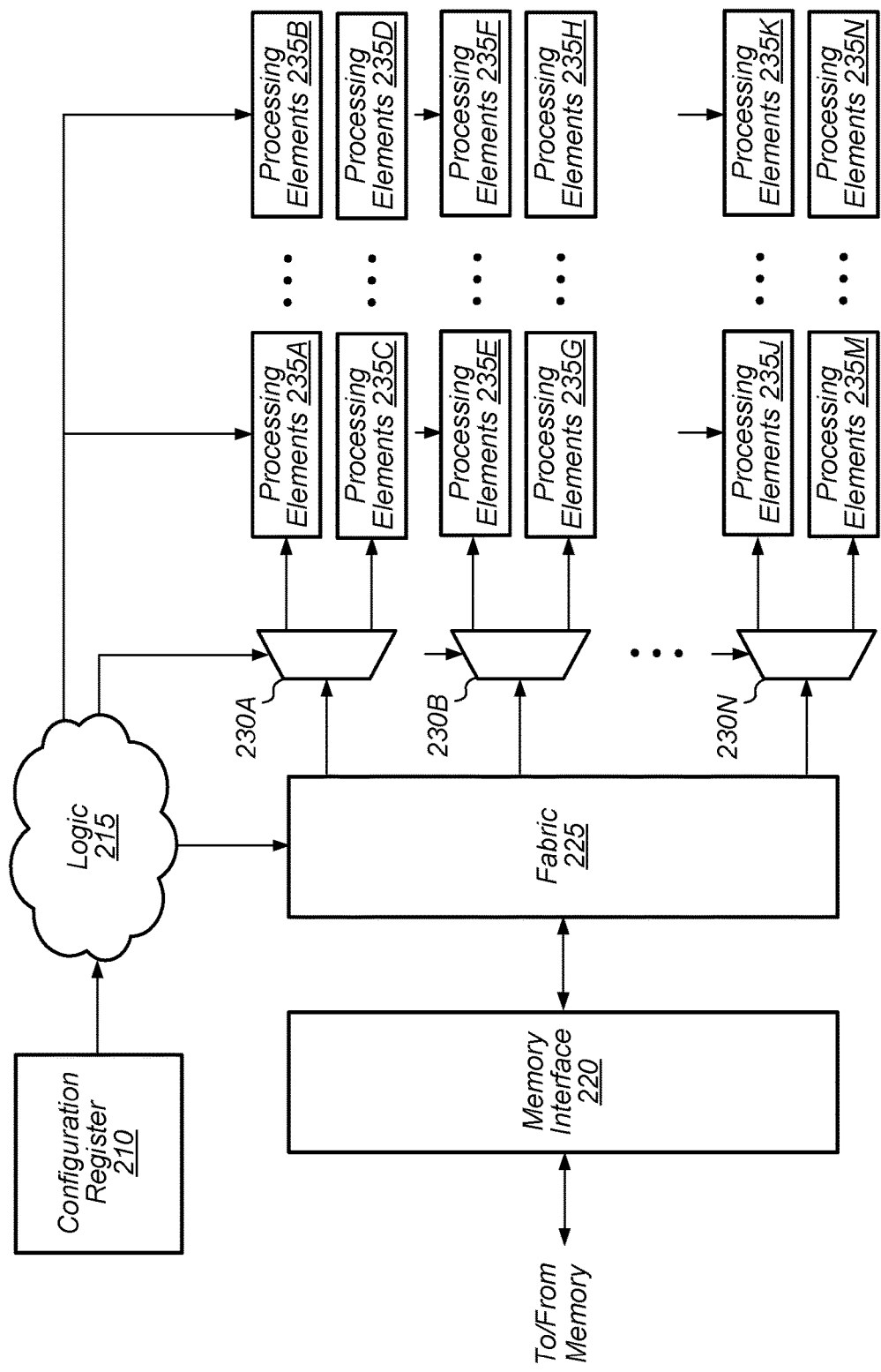
FIG. 2 is a block diagram of one embodiment of a multi-mode hardware unit.

Turning now to FIG. 2, a block diagram of one embodiment of a multi-mode hardware unit 200 is shown. In one embodiment, the logic of multi-mode hardware unit 200 is implemented as combined video codec and inference engine 105 (of FIG. 1). In one embodiment, multi-mode hardware unit 200 includes configuration register 210, logic 215, memory interface 220, fabric 225, demultiplexers 230A-N, and processing elements 235A-N. It should be understood that the example of multi-mode hardware unit 200 shown in FIG. 2 is merely indicative of one particular embodiment. In other embodiments, multi-mode hardware unit 200 can include other components and/or be arranged in a different manner.

In one embodiment, configuration register 210 stores the current operating mode of multi-mode hardware unit 200. In one embodiment, configuration register 210 is programmable via software. Configuration register 210 can also be referred to as a mode register. Depending on the embodiment, multi-mode hardware unit 200 can operate in any number of different modes. In one embodiment, multi-mode hardware unit 200 is configured to operate as a video codec, video encoder, or video decoder in a first mode and as an inference engine in a second mode. In other embodiments, multi-mode hardware unit 200 can operate in three or more different modes. The value(s) stored in configuration register 210 indicate the current operating mode of multi-mode hardware unit 200. Multi-mode hardware unit 200 also includes memory interface 220 coupled to one or more memory devices (not shown). Multi-mode hardware unit 200 also includes fabric 225 coupled to memory interface 220, with fabric 225 representative of any type of communication fabric.

Fabric 225 and demultiplexers (or demuxes) 230A-N are representative of any type of routing logic including within multi-mode hardware unit 200. While fabric 225 is shown as a single module in unit 200, it should be understood that fabric 225 can be distributed throughout unit 200 to facilitate the routing of signals and data to various components. Fabric 225 and demuxes 230A-N can be reconfigured by control signals form logic 215 depending on the operating mode. For example, the input data can traverse a first path through a first group of processing elements for a first mode, the input data can traverse a second path through a second group of processing elements for a second mode, and so on. Accordingly, some of the processing elements 235A-N can be bypassed depending on the mode.

In one embodiment, a first portion of processing elements 235A-N can be shared between operating modes, a second portion of processing elements 235A-N can be utilized for a first mode, and third portion of processing elements 235A-N can be utilized for a second mode. Additionally, a portion of processing elements 235A-N can be reprogrammed or reconfigured depending on the operating mode. In one embodiment, processing elements 235A-N include a plurality of multiplier-accumulator (MAC) units. Processing elements 235A-N can also include other hardware units including registers, muxes, demuxes, adders, digital logic gates, and/or other components.

Figure 3:
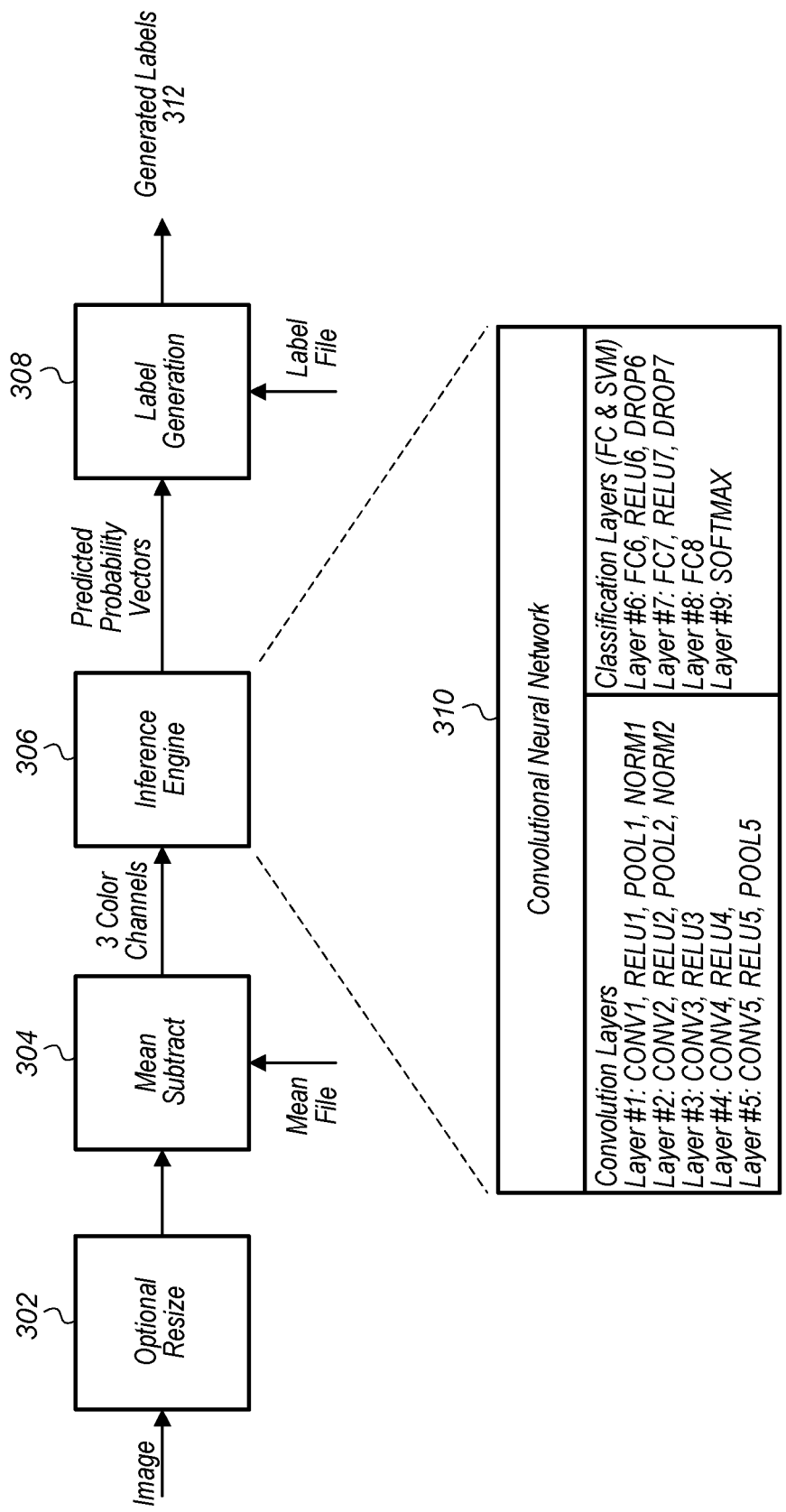
FIG. 3 is a block diagram of one embodiment of the operation of an inference engine within a system.

Turning now to FIG. 3, a block diagram of one embodiment of the operation of an inference engine 306 within a system is shown. In various embodiments, inference engine 306 is implemented as part of combined video codec and inference engine 105 (as shown in FIG. 1). In one embodiment, inference engine 306 is configured to receive input image data, which can be a frame of a video stream. In one embodiment, the input image data is generated by a source which is different from the video codec. In another embodiment, the input image data provided to inference engine 306 is generated by the video codec. Depending on the embodiment, one or more operations can be performed on the input image data before inference engine 306 receives the data. For example, the input image may be optionally resized in unit 302. Also, the mean image file may be subtracted from the input image in mean subtraction unit 304. In one embodiment, the output of unit 304 includes three color channels. In other embodiments, the output of unit 304 can be the image in other formats (e.g., YCbCr, YUV, ARGB) and/or with other numbers of color component channels. The output of unit 304 is coupled to inference engine 306.

In one embodiment, inference engine 306 is implemented as a trained convolutional neural network. For example, inference engine 306 is expanded into convolutional neural network 310 to indicate one possible implementation of inference engine 306. In other embodiments, inference engine 306 can be implemented as other types of machine learning and expert system models. As shown in FIG. 3, convolutional neural network 310 includes nine layers. Layers 1-5 are convolution layers and layers 6-9 are classification layers. However, it should be understood that this is merely one possible implementation of a convolutional neural network. In other embodiments, convolutional neural network 310 can include other numbers and/or other types of layers.

In one embodiment, inference engine 306 generates predicted probability vectors which are provided to label generation unit 308. Label generation unit 308 also receives a label file as an input, and label generation unit 308 produces generated labels 312 based on the predicted probability vectors and the label file. For example, in one embodiment, inference engine 308 is configured to detect certain objects in the input image. Each label of generated labels 312 can include a probability that a corresponding object was detected in the input image.

Figure 4:
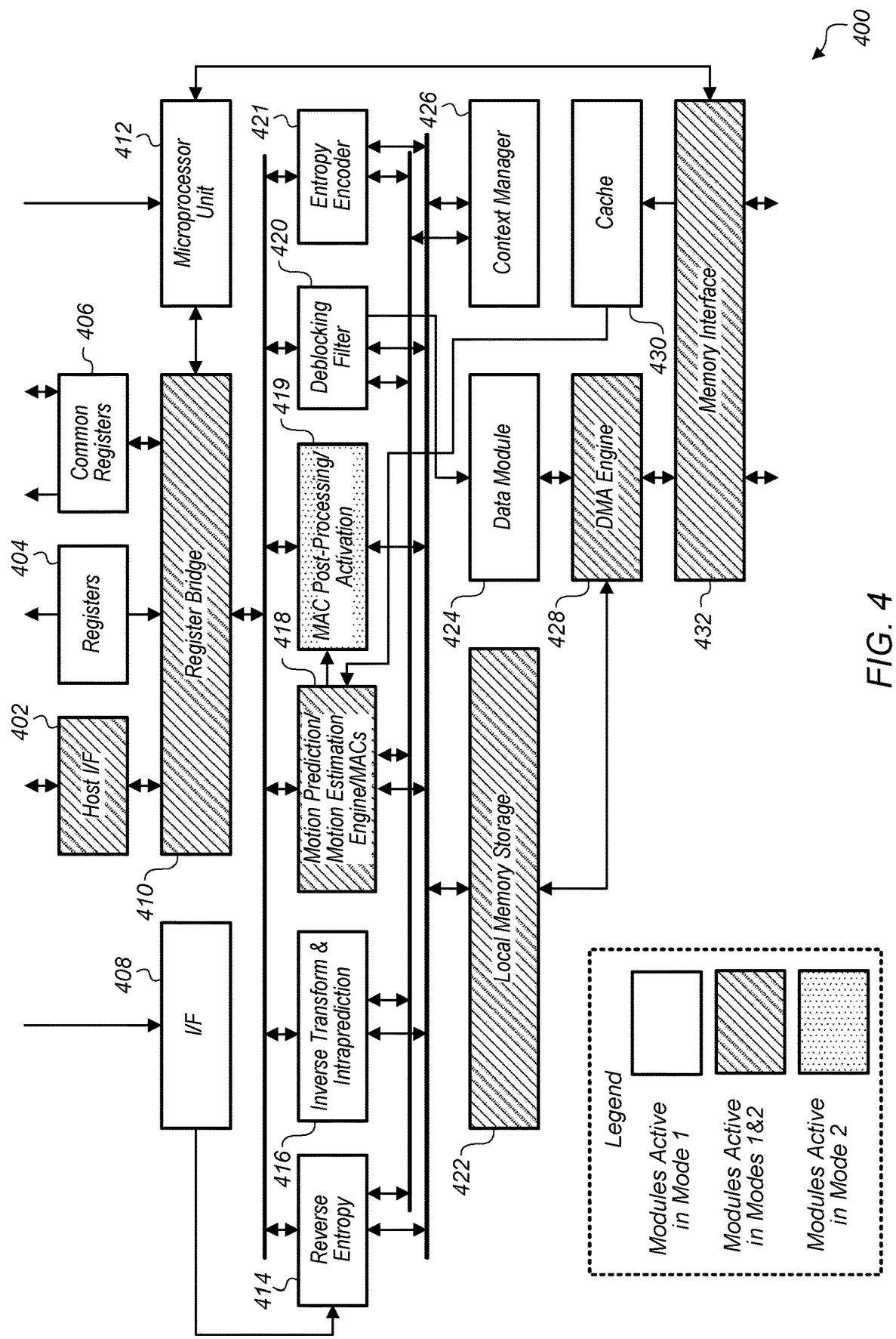
FIG. 4 is a block diagram of one embodiment of a combined unit for combining the functionality of an inference engine and a video codec.

Referring now to FIG. 4, a block diagram of one embodiment of a combined unit 400 for combining the functionality of an inference engine and a video codec is shown. In one embodiment, some of the modules of combined unit 400 are utilized only for the video codec. When combined unit 400 is operating as a video codec, video encoder, or video decoder, this can be referred to as a first mode. The modules used only in the first mode include registers 404, common registers 406, interface module 408, reverse entropy module 414, inverse transform and intraprediction module 416, data module 424, microprocessor unit 412, deblocking filter 420, entropy encoder 421, context manager 426, and cache 430. These modules are shown as clear blocks as indicated by the legend.

In one embodiment, the modules which are shared between the video codec and the inference engine are indicated by the blocks with diagonal lines. When combined unit 400 is operating as an inference engine, this can be referred to as a second mode. In various embodiments, selection of the first or second mode can be performed by setting a corresponding value in a configuration register (e.g., configuration register 210 of FIG. 2). The shared modules include host interface unit 402, register bridge 410, motion prediction/motion estimation engine/(MACs) 418, local memory storage 422, DMA engine 428, and memory interface 432. MAC post-processing and/or activation layer 419 is utilized in the second mode by the inference engine. In one embodiment, data from motion prediction/motion estimation engine/MACs 418 is provided to MAC post-processing and/or activation layer 419 for post-processing, and then the post-processed data is written to local memory storage 422. In various embodiments, the functionality of MAC post-processing and/or activation layer 419 includes, but is not limited to, max pooling, rectified linear units, local/global average pooling, normalization, etc.

In one embodiment, the MACs of motion prediction/motion estimation engine/MACs 418 are shared between the video codec and the inference engine. In one embodiment, only the multipliers of motion prediction/motion estimation engine/MACs 418 are shared with the inference engine, while in another embodiment, both multipliers and accumulators are shared. In one embodiment, the combined unit 400 can be utilized for a simultaneous use case when the unit 400 processes a received video stream by interleaving video codec operations with inference engine operations. In some embodiments, setting the operating mode for unit 400 can cause input data to traverse a path corresponding to the mode. For example, while operating in a first mode as a codec, input data can traverse any of the modules depicted in FIG. 4 as appropriate. While operating in a second mode as an inference engine, only a subset of the modules shown in FIG. 4 can be used to process data while one or more of the modules may be purposely bypassed. Such bypass could be via routing (e.g., using multiplexing techniques) that does not traverse a given module. Alternatively, bypass could be achieved by having modules pass-thru received data without modification. Various such embodiments are possible and are contemplated.

It should be understood that the combined unit 400 shown in FIG. 4 is merely one example of logic that can be shared between a video codec and an inference accelerator. In other embodiments, a combined unit can include other components and/or be arranged differently than is shown in FIG. 4. Additionally, other distributions of shared and unshared modules can be utilized in other embodiments.

Figure 5:
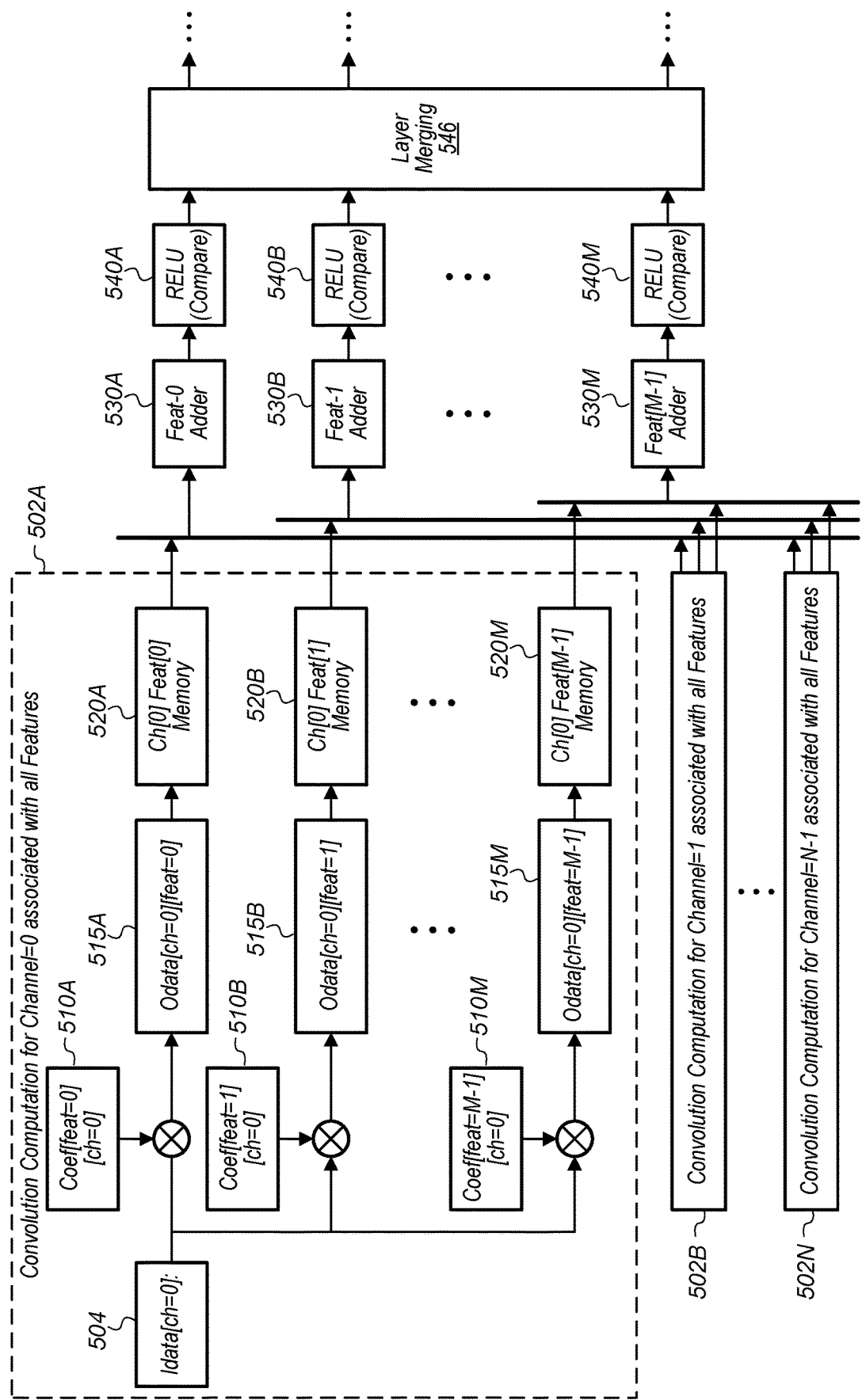
FIG. 5 is a block diagram of one embodiment of an inference engine.

Turning now to FIG. 5, a block diagram of one embodiment of an inference engine 500 is shown. Inference engine 500 includes a plurality of channel processing engines 502A-N. It is noted that inference engine 500 can also be referred to as an inference accelerator. The number of channel processing engines 502A-N can vary from embodiment to embodiment. Channel processing engine 502A is expanded to show the components of a channel processing engine in accordance with one embodiment. The other channel processing engines 502B-N can include a similar arrangement of components.

In one embodiment, each convolution performed by channel processing engines 520A-N is a 3×3 convolution. In other embodiments, other sizes of convolutions can be performed between the input data 504 and the coefficients of features 510A-M. The outputs of the convolutions for features 510A-M are feature maps 515A-M which can be stored in memories 520A-M. The other channel processing engines 520B-N perform convolutions on different input data but with the same features 510A-M as are utilized by channel processing engine 520A.

Then, the feature maps for feature-0 for all channel processing engines are coupled to the inputs of feature-0 adder 530A. Feature-0 adder 530A adds together the feature maps, corresponding to feature-0, from channel processing engines 502A-M to generate a single sum for all of the channel processing engines 502A-M. Also, feature-1 adder adds together the feature maps, corresponding to feature-1, from channel processing engines 502A-M to generate a single sum for all of the channel processing engines 502A-M. The other adders 530B-M perform similar processing to combine the input data from all of the channel processing engines 502A-M for corresponding features.

In one embodiment, the sums generated by feature map adders 530A-M are provided to rectified linear unit (RELUs) 540A-M and then provided to layer merging module 546. In one embodiment, layer merging module 546 merges together two or more subsequent layers of the convolutional neural network. Additional processing of the data can be performed after layer merging module 546. In another embodiment, the sums generated by adders 530A-M are written to memory.

Figure 6:
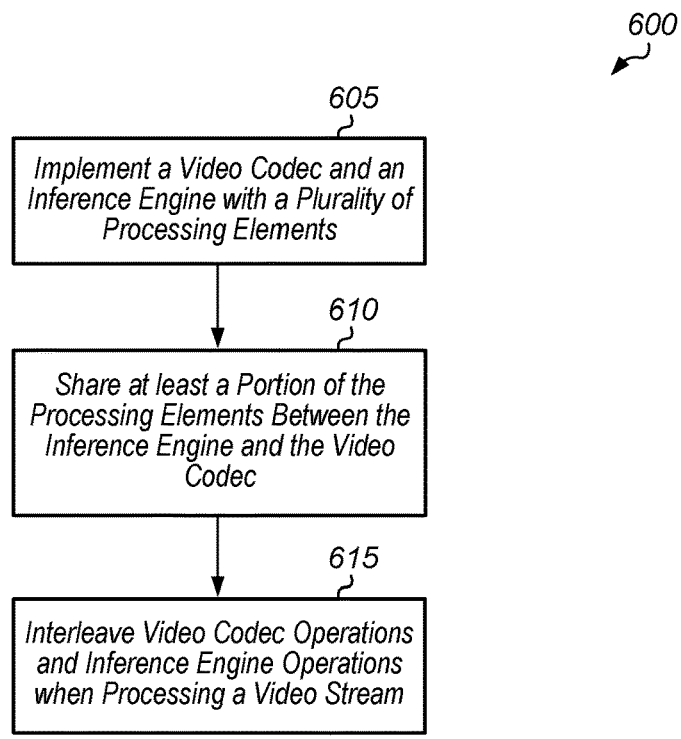
FIG. 6 is a generalized flow diagram illustrating one embodiment of a method for combining an inference engine and a video codec.
Figure 7:
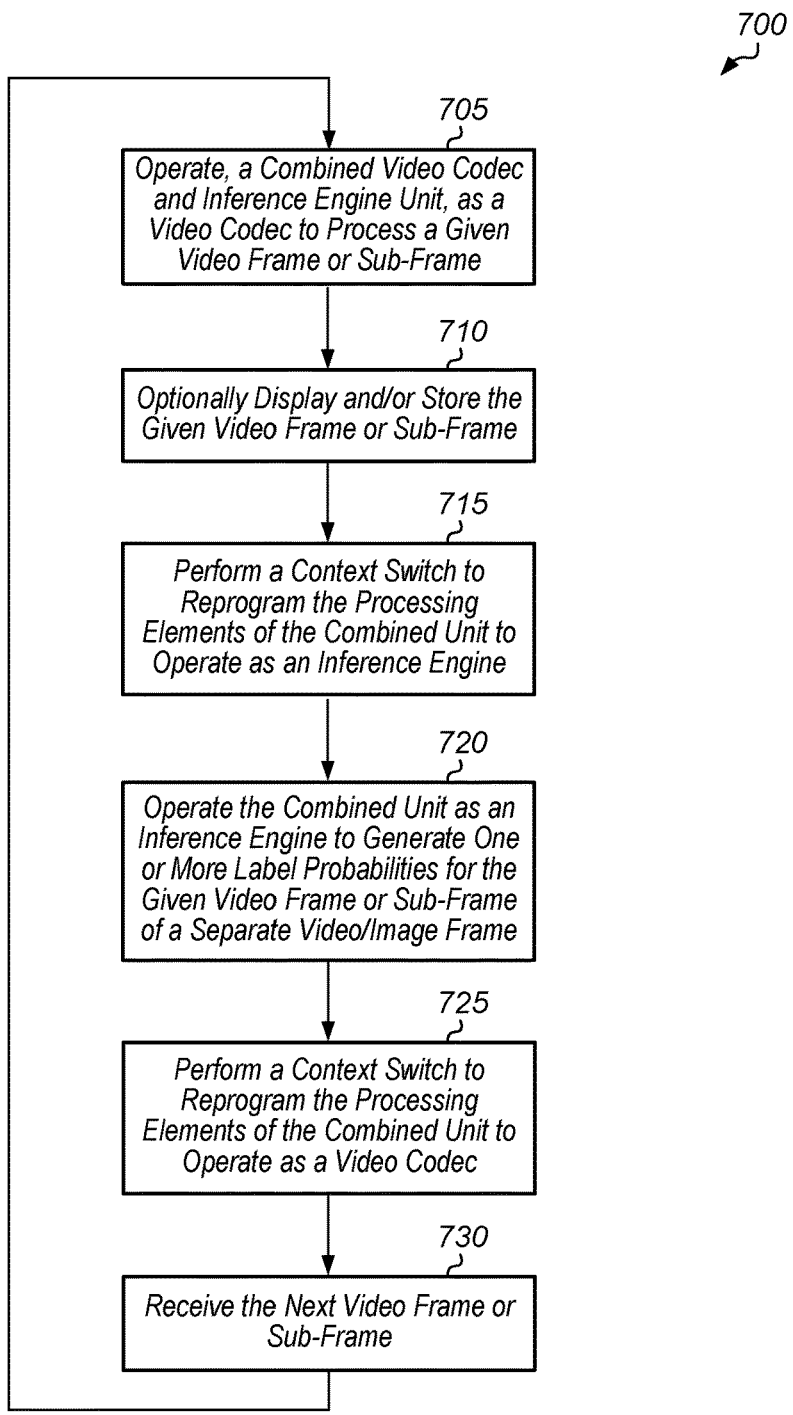
FIG. 7 is a generalized flow diagram illustrating one embodiment of a method for using a combined unit to interleave video codec and inference engine operations.
Figure 8:
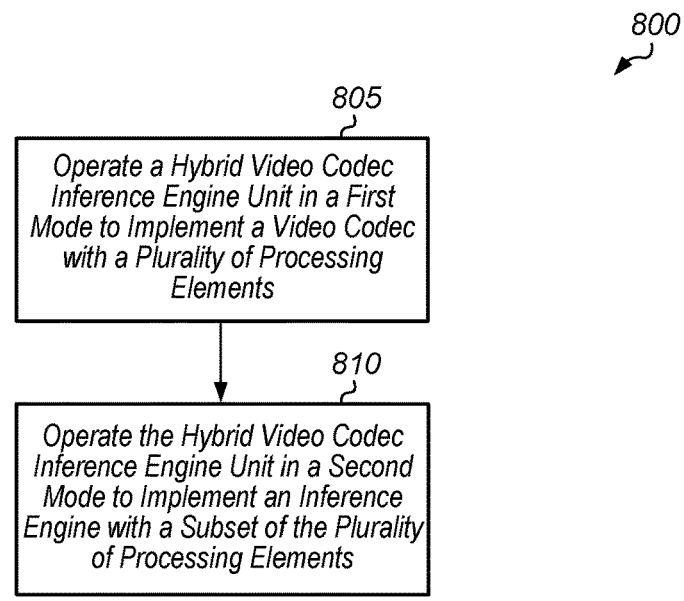
FIG. 8 is a generalized flow diagram illustrating one embodiment of a method for implementing a hybrid video codec inference engine unit.

Referring now to FIG. 6, one embodiment of a method 600 for combining an inference engine and a video codec is shown. For purposes of discussion, the steps in this embodiment and those of FIGS. 7-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 600.

A system implements a video codec and an inference engine with a plurality of processing elements (block 605). In one embodiment, the system (e.g., system 100 of FIG. 1) includes a plurality of processing elements coupled to one or more memory devices. In one embodiment, the plurality of processing elements include a plurality of multiplier-accumulator (MACs) units. The system shares at least a portion of the processing elements between the inference engine and the video codec (block 610). In one embodiment, the portion of processing elements which are shared comprise a motion prediction/motion estimation engine/MACs, internal memory storage, and various peripherals. The peripherals can include a memory interface, DMA engine, and a microprocessor. In other embodiments, other portions of the processing elements can be shared between the inference engine and the video codec.

The system interleaves video codec operations and inference engine operations when processing a video stream (block 615). In one embodiment, the video codec operations are performed to decompress frames of a received video stream. In one embodiment, the inference engine is configured to identify features within the decompressed video frame and/or label the decompressed video frame according to one or more categories. In another embodiment, the inference engine processes a different frame than the frame decoded by the video codec engine. After block 615, method 600 ends.

Turning now to FIG. 7, one embodiment of a method 700 for using a combined unit for simultaneous video codec and inference engine operations is shown. A combined video codec and inference engine unit operates as a video codec to process a given video frame or sub-frame (block 705). It is noted that the processing can include encoding or decoding of the given video frame or sub-frame. Accordingly, depending on the embodiment, the video codec can be a video decoder, video encoder, or a video codec. The combined unit includes a plurality of processing elements which are programmable to operate as a video codec or an inference engine. The processing elements include at least a plurality of multiplier-accumulator (MAC) units.

Next, the given video frame or sub-frame is optionally displayed and/or stored (block 710). Then, the combined unit performs a context switch to reprogram the processing elements to operate as an inference engine (block 715). Next, the combined unit operates as an inference engine to generate one or more label probabilities for a given video frame or sub-frame (block 720). In one embodiment, the given video frame or sub-frame is different from the video frame or sub-frame being processed by the video codec. In another embodiment, the given video frame or sub-frame is the same video frame or sub-frame being processed by the video codec. Then, the combined unit performs a context switch to reprogram the processing elements to operate as a video codec (block 725). Next, the combined unit receives the next video frame or sub-frame (block 730). After block 730, method 700 returns to block 705.

Turning now to FIG. 8, one embodiment of a method 800 for implementing a hybrid video codec inference engine unit is shown. A hybrid video codec inference engine unit operates in a first mode to implement a video codec with a plurality of processing elements (block 805). In one embodiment, the hybrid video code inference engine unit includes the logic shown in multi-mode hardware unit 200 (of FIG. 2). In another embodiment, the hybrid video code inference engine unit includes the logic shown in combined unit 400 (of FIG. 4). The hybrid video codec inference engine unit operates in a second mode to implement an inference engine with a subset of the plurality of processing elements (block 810). After block 810, method 800 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A system comprising:
a processing unit;
a memory; and a hybrid video codec inference engine unit comprising a plurality of processing elements including a motion prediction engine, wherein the hybrid video codec inference engine unit is configured to operate in:
  a first mode to implement a video codec; and
  a second mode to implement an inference engine;
wherein the hybrid video codec inference engine unit is configured to:
  decompress a first video frame by operating the plurality of processing elements when operating in the first mode;
  perform a context switch to reprogram the plurality of processing elements to operate in the second mode;
  process the first video frame with the plurality of processing elements operating in the second mode as the inference engine; and
  generate, by the plurality of processing elements operating in the second mode as the inference engine, one or more label probabilities for the first video frame;
  wherein the motion prediction engine is used in both the first mode and the second mode.

2. The system as recited in claim 1, wherein
a first subset of the plurality of processing elements are utilized in both the first mode and the second mode;
a second subset of the plurality of the processing elements of the hybrid video codec inference engine unit are utilized in only the first mode; and
a third subset of the plurality of the processing elements of the hybrid video codec inference engine unit are utilized in only the third mode.

3. The system as recited in claim 2, wherein the first subset comprises multipliers and/or accumulators of a plurality of multiplier-accumulator (MAC) units, internal memory, and a plurality of peripherals.

4. The system as recited in claim 2, wherein the first subset comprises a motion prediction engine.

5. The system as recited in claim 1, wherein the hybrid video codec inference engine unit is further configured to interleave video codec and inference engine operations when processing a video stream.

6. The system as recited in claim 1, wherein the hybrid video codec inference engine unit is further configured to:
  perform a context switch to reprogram the plurality of processing elements to operate in the first mode as the video codec; and
  receive and decompress a second video frame with the plurality of processing elements operating in the first mode as the video codec.

7. The system as recited in claim 1, wherein the inference engine is a trained convolutional neural network.

8. A method comprising:
  decompressing a first video frame by operating a plurality of processing elements, including a motion prediction engine, of a hybrid video codec inference engine unit in a first mode to implement a video codec;
  performing a context switch to reprogram the plurality of processing elements of the hybrid video codec inference engine unit to operate in a second mode to implement an inference engine;
  processing the first video frame with the plurality of processing elements operating in the second mode as the inference engine; and
  generating, by the plurality of processing elements operating in the second mode as the inference engine, one or more label probabilities for the first video frame;
  wherein the motion prediction engine is used in both the first mode and the second mode.

9. The method as recited in claim 8, further comprising utilizing a first subset of a plurality of processing elements in both the first mode and the second mode;
  a second subset of the plurality of the processing elements of the hybrid video codec inference engine unit are utilized in only the first mode; and
  a third subset of the plurality of the processing elements of the hybrid video codec inference engine unit are utilized in only the third mode.

10. The method as recited in claim 9, wherein the first subset comprises multipliers and/or accumulators of a plurality of multiplier-accumulator (MAC) units, internal memory, and a plurality of peripherals.

11. The method as recited in claim 9, wherein the first subset comprises a motion prediction engine.

12. The method as recited in claim 8, further comprising interleaving video codec and inference engine operations when processing a video stream.

13. The method as recited in claim 8, further comprising:
  performing a context switch to reprogram the plurality of processing elements to operate in the first mode as the video codec; and
  receiving and decompressing a second video frame with the plurality of processing elements operating in the first mode as the video codec.

14. The method as recited in claim 8, wherein the inference engine is a trained convolutional neural network.

15. An apparatus comprising:
  a memory; and
  a hybrid video codec inference engine unit comprising a plurality of processing elements including a motion prediction engine, wherein the hybrid video codec inference engine unit is configured to operate in:
    a first mode to implement a video codec; and
    a second mode to implement an inference engine;
  wherein the hybrid video codec inference engine unit is configured to:
    receive a video stream;
    decompress a first video frame of the video stream by operating the plurality of processing elements in the first mode;
    perform a context switch to reprogram the plurality of processing elements to operate in the second mode;
    process the first video frame with the plurality of processing elements operating in the second mode as the inference engine; and
    generate, by the plurality of processing elements operating in the second mode as the inference engine, one or more label probabilities for the first video frame;
    wherein the motion prediction engine is used in both the first mode and the second mode.

16. The apparatus as recited in claim 15, wherein a first subset of the plurality of processing elements are utilized in both the first mode and the second mode;
  a second subset of the plurality of the processing elements of the hybrid video codec inference engine unit are utilized in only the first mode; and
  a third subset of the plurality of the processing elements of the hybrid video codec inference engine unit are utilized in only the third mode.

17. The apparatus as recited in claim 16, wherein the first subset comprises multipliers and/or accumulators of a plurality of multiplier-accumulator (MAC) units, internal memory, and a plurality of peripherals.

18. The apparatus as recited in claim 16, wherein the first subset comprises a motion prediction engine.

19. The apparatus as recited in claim 15, wherein the second computing device is further configured to:
- perform a context switch to reprogram the plurality of processing elements to operate in the first mode as the video codec; and
- receive and decompress a second video frame with the plurality of processing elements operating in the first mode as the video codec.

20. The apparatus as recited in claim 15, wherein the inference engine is a trained convolutional neural network.

* * * * *